United States Patent
Nakai et al.

(10) Patent No.: US 8,416,333 B2
(45) Date of Patent: Apr. 9, 2013

(54) IMAGING APPARATUS

(75) Inventors: Yasunori Nakai, Nara (JP); Takahiro Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 225 days.

(21) Appl. No.: 12/869,834

(22) Filed: Aug. 27, 2010

(65) Prior Publication Data

US 2011/0050974 A1   Mar. 3, 2011

(30) Foreign Application Priority Data

Aug. 31, 2009  (JP) ................................ 2009-199706

(51) Int. Cl.
*H04N 5/222* (2006.01)
(52) U.S. Cl. .............................. 348/333.06; 348/333.13
(58) Field of Classification Search ............. 348/207.99, 348/333.01–333.13, 345; 396/354, 373, 396/374
See application file for complete search history.

(56) References Cited

U.S. PATENT DOCUMENTS

| | | | |
|---|---|---|---|
| 6,091,450 A * | 7/2000 | Hirasawa .................. | 348/333.01 |
| 2002/0196358 A1* | 12/2002 | Kim .......................... | 348/333.06 |
| 2004/0212711 A1* | 10/2004 | Stavely et al. ............. | 348/333.03 |
| 2005/0162541 A1* | 7/2005 | Ito ............................. | 348/345 |
| 2005/0168613 A1* | 8/2005 | Taniguchi ................. | 348/333.09 |
| 2010/0066888 A1* | 3/2010 | Nakai ....................... | 348/333.01 |

FOREIGN PATENT DOCUMENTS

| | | |
|---|---|---|
| JP | 2-179076 | 7/1990 |
| JP | 4-347814 | 12/1992 |
| JP | 2004-201104 | 7/2004 |
| JP | 2007-304438 | 11/2007 |
| JP | 2009-198684 | 9/2009 |
| JP | 2010-136163 | 6/2010 |
| JP | 2010136163 A * | 6/2010 |

* cited by examiner

*Primary Examiner* — Nelson D. Hernández Hernández
*Assistant Examiner* — Dennis Hogue
(74) *Attorney, Agent, or Firm* — Panasonic Patent Center

(57) ABSTRACT

An imaging apparatus for capturing an image includes a first display unit, a second display unit capable of being in a set-in state in which the second display unit is set in a body of the imaging apparatus or a non-set-in state in which the second display unit is not set in the body of the imaging apparatus, a proximity sensor operable to sense proximity of an object, and a controller operable to allow the first display unit to display an image when the proximity sensor senses the proximity of the object, and allows the second display unit to display an image when the proximity sensor does not sense the proximity of the object. The controller controls a sensing function of the proximity sensor according to whether the second display unit is in the set-in state or the non-set-in state. For example, the proximity sensor may sense the proximity of the object when the object is continuously sensed for a predetermined sensing time or more. The controller may set the predetermined sensing time for the second display unit being in the non-set-in state to be longer than the predetermined sensing time for the second display unit being in the set-in state.

10 Claims, 11 Drawing Sheets

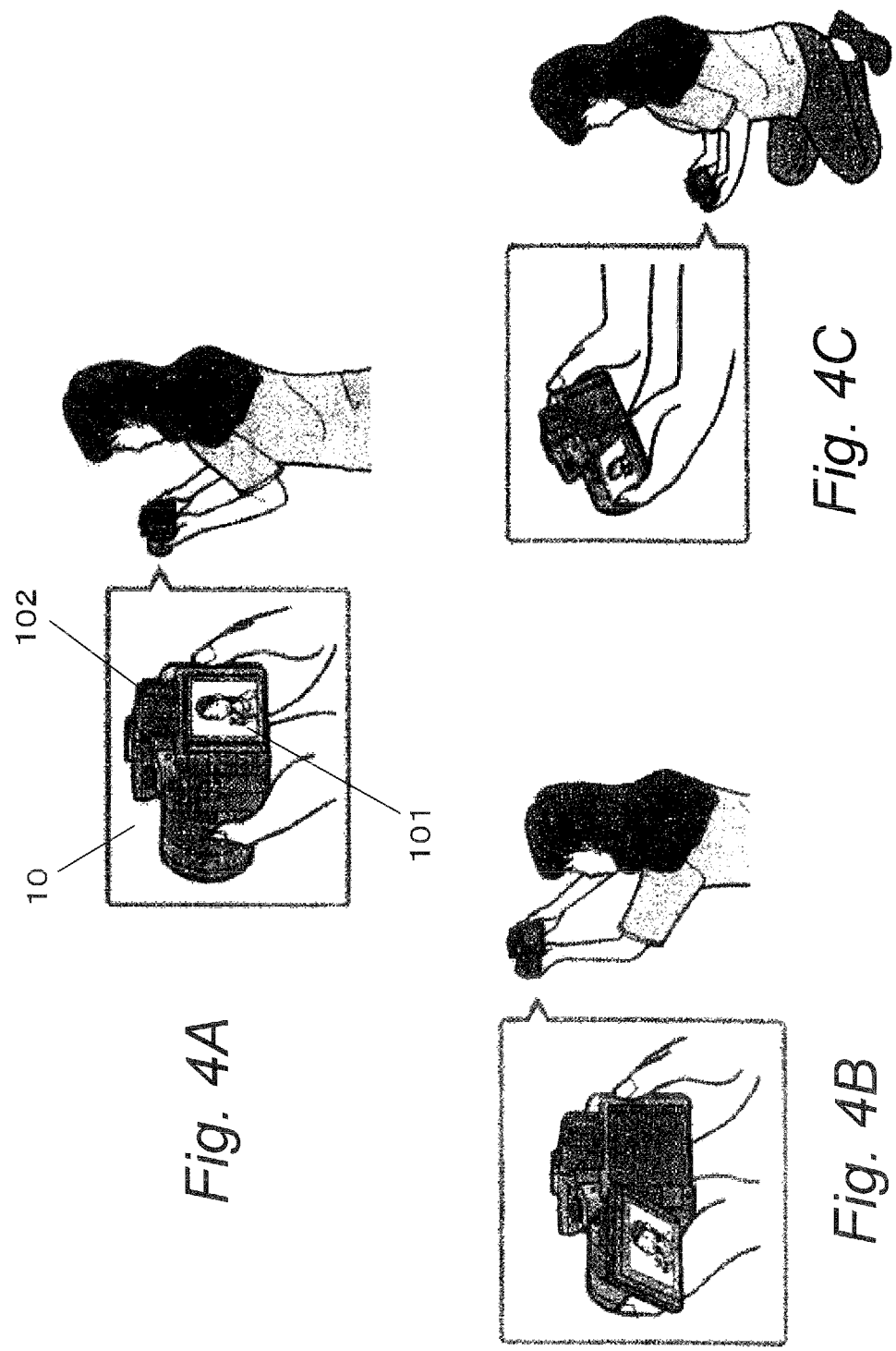

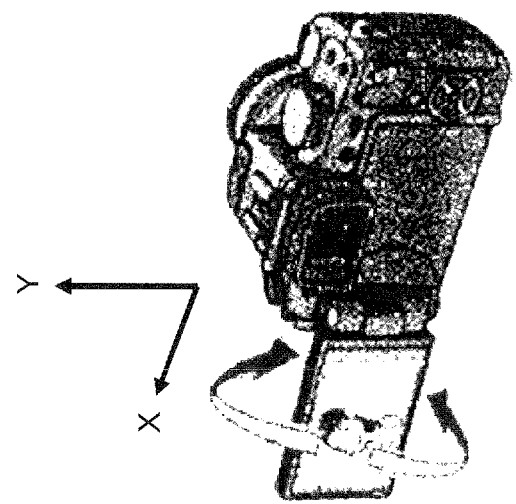
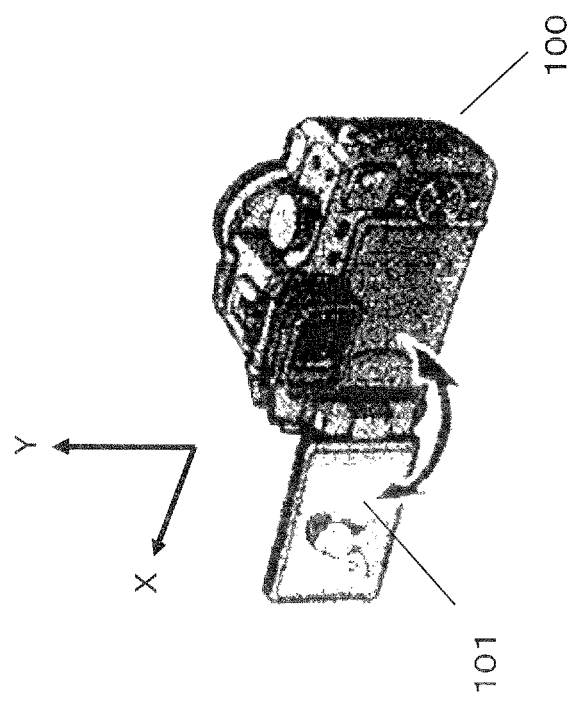

IMAGING APPARATUS

BACKGROUND

1. Technical Field

The technical field relates to an imaging apparatus that records subject image data, and more particularly to the imaging apparatus including two display units.

2. Related Art

JP2004-201104A pertains to an imaging apparatus including a plurality of display units. The imaging apparatus disclosed in JP2004-201104A includes an electronic viewfinder, a LCD (liquid crystal device) monitor, and a sensor that senses proximity of an eye to the finder (that is, a state in which user's eye is in proximity to the finder). When proximity of eye to the finder (a state in which person's (user's) eye is in proximity to the finder) is sensed by the sensor, the imaging apparatus displays an image on a first display unit (finder), and when the proximity of eye is not sensed, the imaging apparatus displays an image on a second display unit (LCD monitor). That is, two display units are automatically switched based on the result of sensing by the sensor.

In addition, as another imaging apparatus, an apparatus is known which can selectively switch display modes among a display mode which automatically switches display between display performed on an electronic viewfinder and display performed on a LCD monitor depending on proximity of an eye, as described above, a display mode in which display is performed on the electronic viewfinder, and a display mode in which display is performed by the LCD monitor, by user's operating a slide switch or a rotary switch.

In the art disclosed in JP2004-201104A, when a photographer performs a shooting operation at a high or low angle while viewing an image displayed on the LCD monitor, if the photographer's arm, a strap of the imaging apparatus, or the like, is present near an eye proximity sensor (sensor), inconvenience may occur that the eye proximity sensor erroneously senses proximity of eye and accordingly the display mode may be switched from the display mode in which display is performed on the LCD monitor to the display mode in which display is performed on the electronic viewfinder.

To avoid this inconvenience, selectively switching from an automatic mode to a display mode in which display is performed on the LCD monitor is troublesome for the photographer, and providing a slide switch or a rotary switch leads to an increase in the cost of the imaging apparatus.

To solve the above-described problems, an imaging apparatus having a plurality of display units is provided, which, even when shooting is performed at a high or low angle, can prevent erroneous sensing of eye proximity by a proximity sensor to improve photographer's usability without inviting an increase in the cost of the imaging apparatus.

SUMMARY

In a first aspect, an imaging apparatus for capturing an image is provided, which includes a first display unit, a second display unit capable of being in a set-in state in which the second display unit is set in a body of the imaging apparatus or a non-set-in state in which the second display unit is not set in the body of the imaging apparatus, a proximity sensor operable to sense a proximity of an object, and a controller operable to allow the first display unit to display an image when the proximity sensor senses the proximity of the object, and allow the second display unit to display an image when the proximity sensor does not sense the proximity of the object. The controller controls a sensing function of the proximity sensor according to whether the second display unit is in the set-in state or the non-set-in state.

For example, the proximity sensor may sense the proximity of the object when the object is continuously sensed for at least a predetermined sensing time, and the controller may set the predetermined sensing time for the second display unit being in the non-set-in state to be longer than the predetermined sensing time for the second display unit being in the set-in state.

Alternatively, the controller may stop the sensing function of the proximity sensor when the second display unit is in the non-set-in state.

Alternatively, the proximity sensor may sense the proximity of the object when the object is present within a predetermined sensing distance from the proximity sensor, and the controller may set the predetermined sensing distance for the second display unit being in the non-set-in state to be shorter than the predetermined sensing distance for the second display unit being in the set-in state.

Alternatively, the proximity sensor may sense the proximity of the object when at least one of a following occurs: it is sensed that the object is within a predetermined sensing distance from the proximity sensor; and the object is continuously sensed for at least a predetermined sensing time, and the controller may set the predetermined sensing distance for the second display unit being in the non-set-in state to be shorter than the predetermined sensing distance for the second display unit being in the set-in state.

Alternatively, the proximity sensor may sense the proximity of the object when it is sensed that the object is within a predetermined sensing distance from the proximity sensor and/or when the object is continuously sensed for a predetermined sensing time or more, and the controller may set the predetermined sensing time for the second display unit being in the non-set-in state to be longer than the predetermined sensing time for the second display unit being in the set-in state.

In a second embodiment, an imaging apparatus for capturing an image is provided, which includes a first display unit, a second display unit capable of being in a set-in state in which the second display unit is set in a body of the imaging apparatus or a non-set-in state in which the second display unit is not set in the body of the imaging apparatus, a proximity sensor operable to sense a proximity of an object, and a controller operable to allow the first display unit to display an image when the proximity sensor senses the proximity of the object, and allow the second display unit to display an image when the proximity sensor does not sense the proximity of the object. When the second display unit is in the non-set-in state, the controller prohibits the first display unit to display an image even if the proximity sensor senses the proximity of the object.

According to the above aspects, without adding any special configuration (a slide switch, a rotary switch, or the like), when the second display unit (e.g., a movable LCD monitor) is in the non-set-in state, even if the proximity sensor senses a proximity of the object, the controller can allow the first display unit (e.g., an electronic viewfinder) not to display an image. Thus, an imaging apparatus can be provided in which, even when the photographer performs shooting at a high or low angle, erroneous sensing by the eye proximity sensor is prevented and usability is improved significantly without inviting an increase in cost.

BRIEF DESCRIPTION OF DRAWINGS

FIGS. 4A to 4C are diagrams describing general postures (horizontal position) of the imaging apparatus during shooting of an image.

FIGS. 7A and 7B are diagrams describing rotation of a movable LCD monitor.

DETAILED DESCRIPTION OF PREFERRED EMBODIMENT

Preferred embodiments will be described below with reference to the drawings.

1. Configuration of Imaging Apparatus

Figure 1:
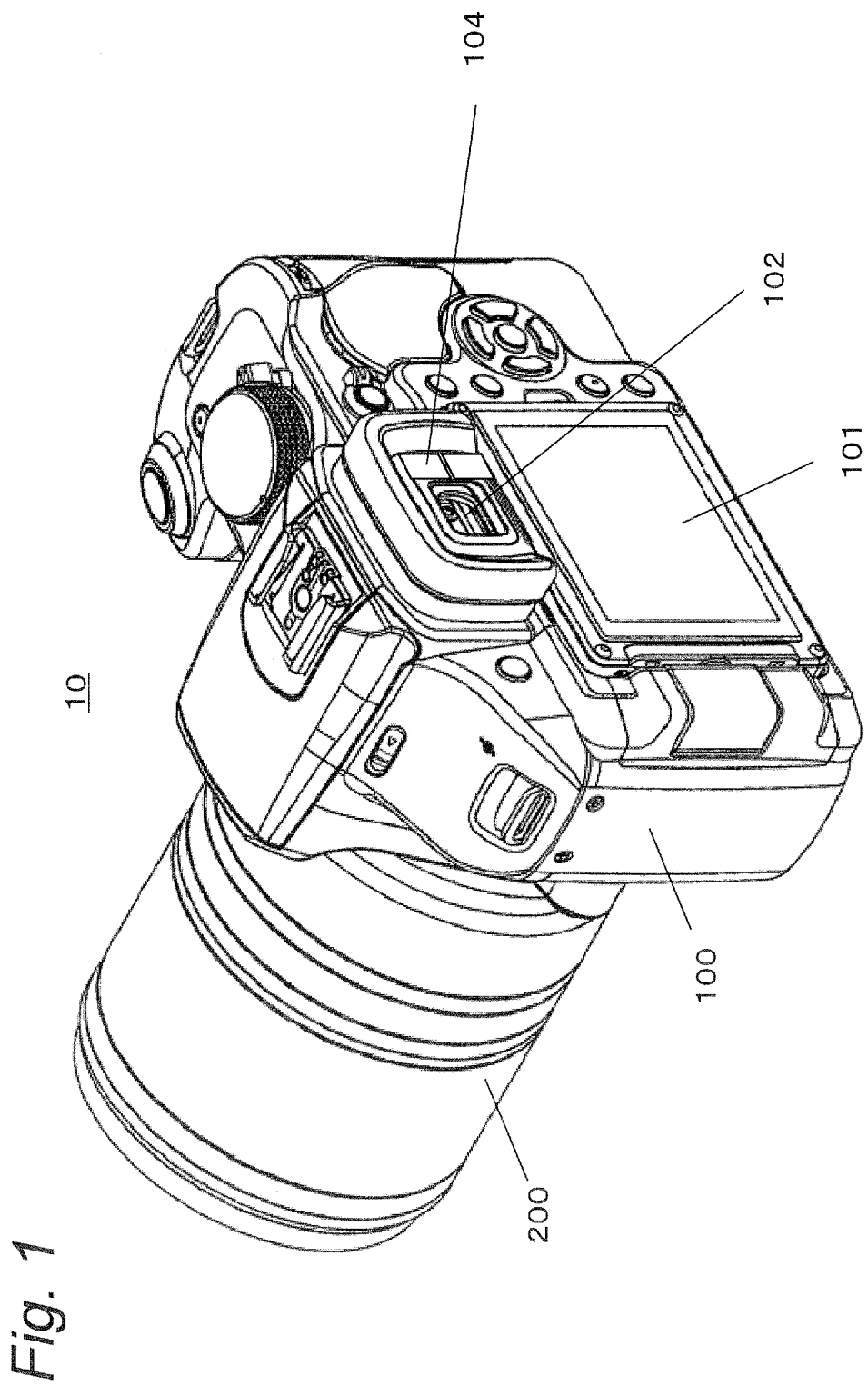
FIG. 1 is a perspective view of an imaging apparatus according to an embodiment.

FIG. 1 is a perspective view of an imaging apparatus (digital camera) which is an example of the preferred embodiment. An imaging apparatus 10 includes a camera body 100 and an interchangeable lens 200 mountable to the camera body 100.

A movable LCD (liquid crystal display) monitor 101 and an electronic viewfinder 102 are provided on the back of the imaging apparatus 10. An eye proximity sensor 104 is provided near the electronic viewfinder 102.

Figure 2:
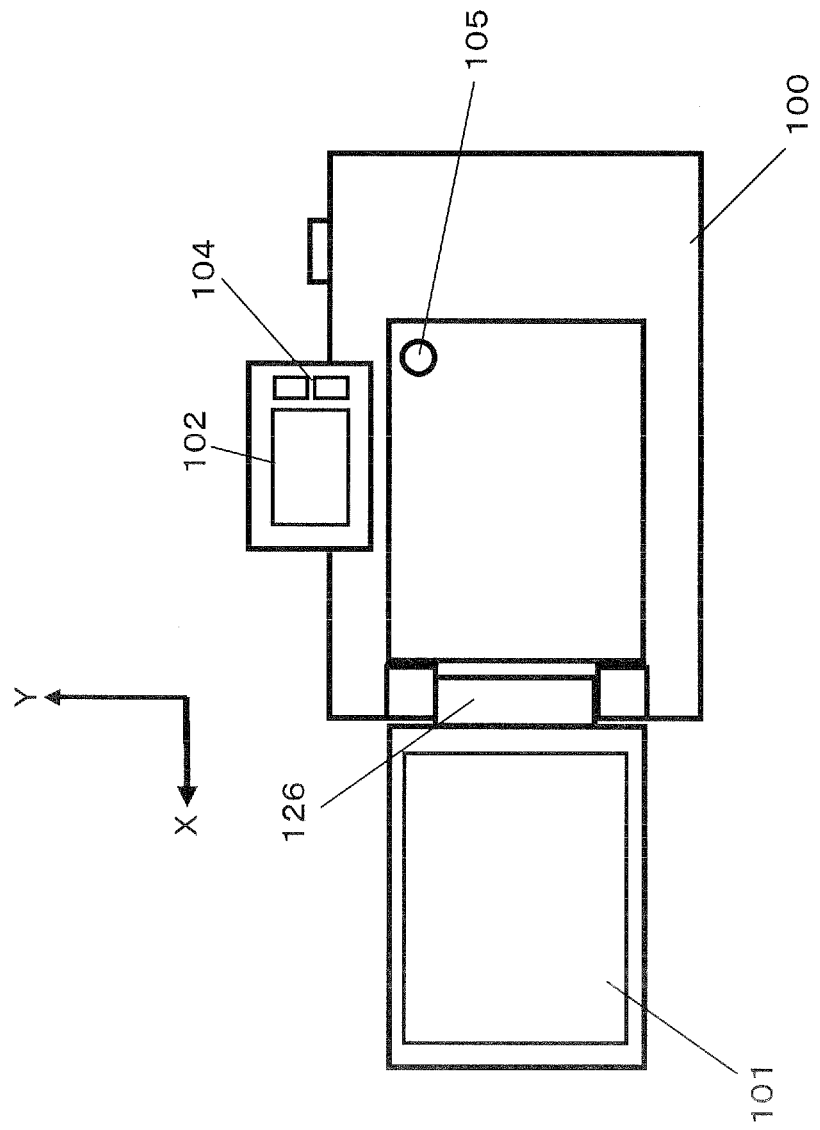
FIG. 2 is a back view of the imaging apparatus according to the embodiment.

FIG. 2 is a back view of the imaging apparatus 10 with the movable LCD monitor 101 being in an open state (hereinafter, referred to as a "non-set-in state"). As shown in the drawing, a switch 105 is further provided on the back of the imaging apparatus 10. The switch 105 is configured so that when the movable LCD monitor 101 is in a closed state (hereinafter, referred to as a "set-in state"), a frame of the movable LCD monitor 101 contacts on and presses the switch 105. On the other hand, when the movable LCD monitor 101 is in a non-set-in state, the frame of the movable LCD monitor 101 does not contact on and press the switch 105.

Figure 3:
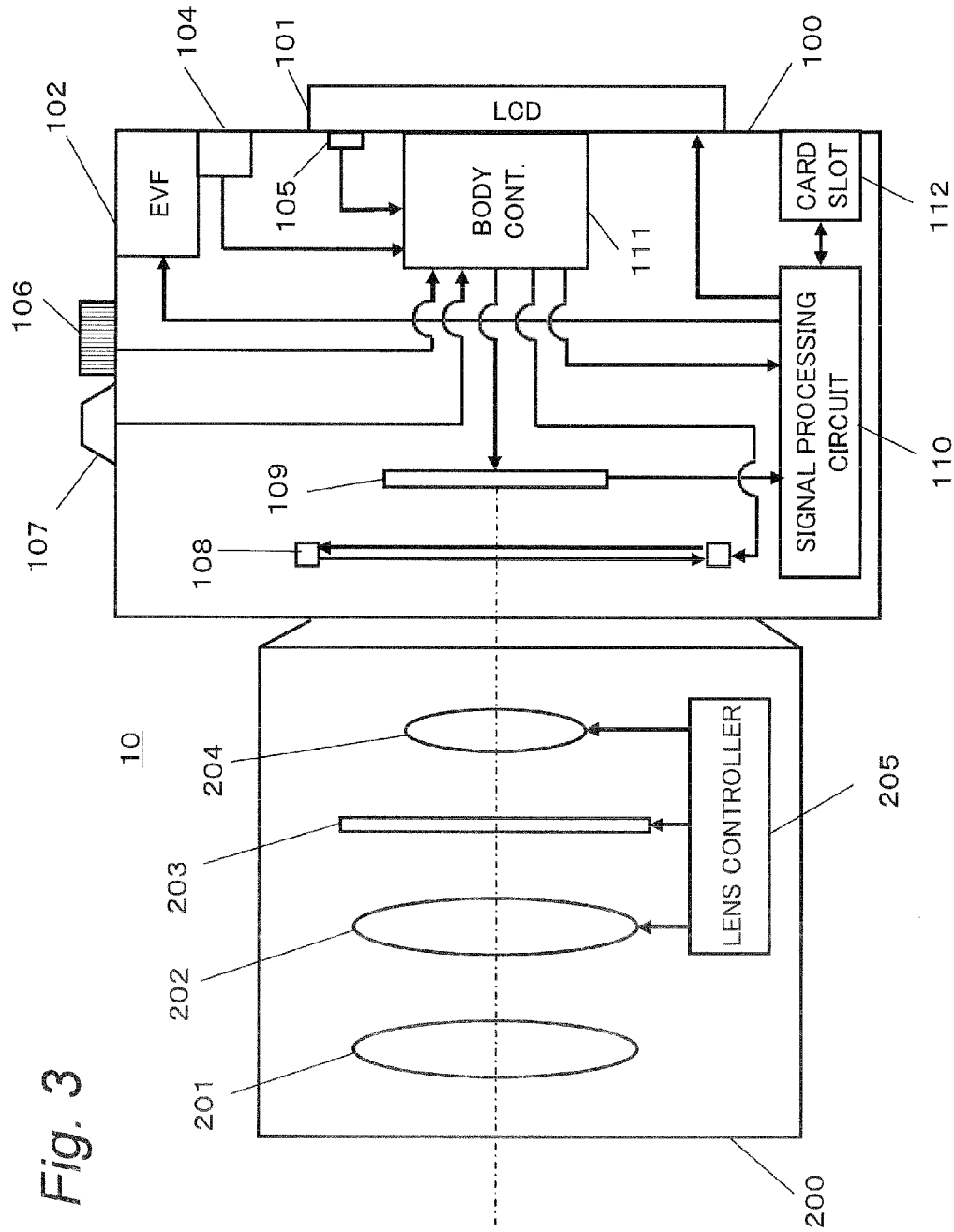
FIG. 3 is a configuration diagram of the imaging apparatus according to the embodiment.

FIG. 3 is a block diagram showing a functional configuration of the imaging apparatus 10. The camera body 100 includes a mode dial 106, a release button 107, a shutter 108, an imaging device 109 (CCD, CMOS sensor, or the like), a signal processing circuit 110, a body controller 111, and a memory card slot 112, in addition to the movable LCD monitor 101, the electronic viewfinder (EVF) 102, the eye proximity sensor 104, and the switch 105.

The interchangeable lens 200 includes an objective lens 201, a zoom lens 202, a diaphragm mechanism 203, a focus lens 204, and a lens controller 205.

The lens controller 205 communicates with the body controller 111 to control operations of the zoom lens 202, the diaphragm mechanism 203, and the focus lens 204.

The electronic viewfinder 102 is a display unit that allows a user to view an image (displayed content) by approximating user's eye to the display unit. By utilizing the electronic viewfinder 102, the user can support the imaging apparatus 10 with his/her hands and a part of his/her face so that the user can determine a composition stably.

The movable LCD monitor 101 is a display unit that allows the user to view an image (displayed content) without approximating user's eye to the display unit. By utilizing the movable LCD monitor 101, the user can view an image on a relatively large screen, and can easily view an image even in a situation in which it is difficult for the user to approximate user's eye to the electronic viewfinder 102, such as in macro photography of a plant using a tripod. The movable LCD monitor 101 is a display unit containing a liquid crystal display (LCD) panel and is configured to move in two axis directions (X- and Y-axis directions) so that an angle of the movable LCD monitor 101 with respect to the camera body 100 can be arbitrarily changed.

The eye proximity sensor 104 is implemented by a proximity sensor that can sense a proximity of an object (including a person) within a predetermined distance. The eye proximity sensor 104 senses a state (eye proximity state) in which an eye of the person (photographer) is in proximity to the electronic viewfinder 102.

The switch 105 is configured so that, when the movable LCD monitor 101 is in a set-in state (i.e., a fixed state), the switch 105 is pressed by the frame of the movable LCD monitor 101 to be turned on, and on the other hand, when the movable LCD monitor 101 is in a non-set-in state (i.e., a movable state), the switch 105 is not pressed by the movable LCD monitor 101 and thus is turned off.

The mode dial 106 is an operating member used by the photographer to set an operating mode of the imaging apparatus 10. The operating mode includes a recording mode which is selected upon shooting an image, and a playback mode which is selected upon playing back a recorded image.

The body controller 111 monitors the states of the eye proximity sensor 104, the switch 105, the mode dial 106, and the release button 107 and controls operations of the shutter 108, the imaging device 109, and the signal processing circuit 110. In addition, the body controller 111 communicates with the lens controller 205 to control the overall operation of the interchangeable lens 200. Note that FIG. 3 does not show a communication path between the body controller 111 and the lens controller 205.

In the imaging apparatus 10 configured in the above-described manner, when the recording mode is selected by the mode dial 106, the shutter 108 is open and the amount of exposure of the imaging device 109 is regulated by the diaphragm mechanism 203 and the shutter 108. The interchangeable lens 200 forms a subject image on the imaging device 109. The imaging device 109 outputs an image signal corresponding to the subject image to the signal processing circuit 110. The signal processing circuit 110 performs a predetermined process on the image signal to generate a video signal, and outputs the video signal to the electronic viewfinder 102 or the movable LCD monitor 101. The signal processing circuit 110 records image data generated by performing a predetermined process on the image signal outputted from the imaging device 109, in a recording medium inserted into the memory card slot 112.

On the other hand, when the playback mode is selected by the mode dial 106, the signal processing circuit 110 reads image data recorded in the recording medium inserted into the memory card slot 112, generates a video signal from the read image data, and outputs the video signal to the electronic viewfinder 102 or the movable LCD monitor 101.

That is, in the present embodiment, when the recording mode is selected by the mode dial 106, an image based on an image signal corresponding to a subject image is displayed on the electronic viewfinder 102 or on the movable LCD monitor 101. On the other hand, when the playback mode is selected by the mode dial 106, an image based on image data recorded in the memory card inserted into the memory card slot 112 is displayed on the electronic viewfinder 102 or on the LCD monitor 101.

The imaging apparatus 10 according to the present embodiment has an automatic switching mode as a display unit switching mode. When the automatic switching mode is selected, an image is displayed on the electronic viewfinder 102 or on the movable LCD monitor 101, according to the result of sensing by the eye proximity sensor 104 and the switch 105. Details of the display unit switching operation will be described later.

2. Postures of Imaging Apparatus

Before describing the operation of the imaging apparatus 10, the postures of the imaging apparatus 10 during use of the imaging apparatus 10 will be described.

FIGS. 4A to 4C are diagrams showing general postures of a photographer using the imaging apparatus 10, during shooting a picture. In FIGS. 4A to 4C, the imaging apparatus 10 is held in a horizontal position. FIG. 4A shows the most common shooting posture with the imaging apparatus 10 held substantially in front of the photographer's face. FIG. 4B shows a shooting posture (high angle) with the imaging apparatus 10 held above the photographer's face, which is often taken when shooting a subject over a crowd of people. FIG. 4C shows a shooting posture (low angle) with the imaging apparatus 10 held below the photographer's face, which is often taken when shooting a flower, an insect, or the like.

On the imaging apparatus 10, the movable LCD monitor 101 that allows the photographer to view a subject with the photographer's face away from the imaging apparatus 10, and the electronic viewfinder 102 that allows the photographer to view a subject when the photographer approximates photographer's face to the imaging apparatus 10 to look through the electronic viewfinder 102, are mounted. FIGS. 4A to 4C all show cases in which the photographer views a subject by means of the movable LCD monitor 101.

Whether to display a subject on the movable LCD monitor 101 or the electronic viewfinder 102 is automatically switched by the eye proximity sensor 104 (a proximity sensor) provided near the electronic viewfinder 102. Specifically, when the eye proximity sensor 104 senses a proximity of the photographer's face, a subject is displayed on the electronic viewfinder 102. On the other hand, when the eye proximity sensor 104 does not sense a proximity of the photographer's face, a subject is displayed on the movable LCD monitor 101.

The movable LCD monitor 101 can transit between a set-in state (FIG. 4A) and a non-set-in state (FIGS. 4B and 4C). Since there is a limit to the viewing angle of the LCD panel, if the movable LCD monitor 101 is in a set-in state during shooting a picture at high or low angle, it is difficult for the photographer to view a subject. Therefore, when high or low angle shooting is performed, it is desirable that the movable LCD monitor 101 be transitioned to a non-set-in state so that the angle of the movable LCD monitor 101 can be adjusted to an angle at which the subject can be clearly viewed. On the other hand, with the electronic viewfinder 102 that allows the photographer to view a subject with the photographer's face close to the imaging apparatus 10 to look through the electronic viewfinder 102, it is difficult for the photographer to shoot a picture at a high or low angle.

It is undeniable that, in shooting a picture at a high angle (FIG. 4B) or a low angle (FIG. 4C), the photographer's hands holding the imaging apparatus 10 are placed in an unnatural position compared to a general shooting posture (FIG. 4A). Hence, the photographer's right hand thumb or the like may be placed near the eye proximity sensor 104. In addition, a strap or a shoulder belt, which is not shown in FIGS. 4A to 4C may be attached to the imaging apparatus 10. When the photographer wraps the strap or the shoulder belt around photographer's hand, they may lie near the eye proximity sensor 104. Furthermore, in shooting at a low angle (FIG. 4C), for example, when the photographer hangs a mobile phone, a portable music player, etc., on photographer's neck with a neck strap or when the photographer wraps a scarf, a stole, or the like, around photographer's neck, they may lie near the eye proximity sensor 104. If it happens, then such inconvenience occurs that the eye proximity sensor 104 erroneously senses eye proximity and accordingly a subject is displayed on the electronic viewfinder 102 while the photographer is viewing the subject on the movable LCD monitor 101.

Figures 5A, 5B, 5C:
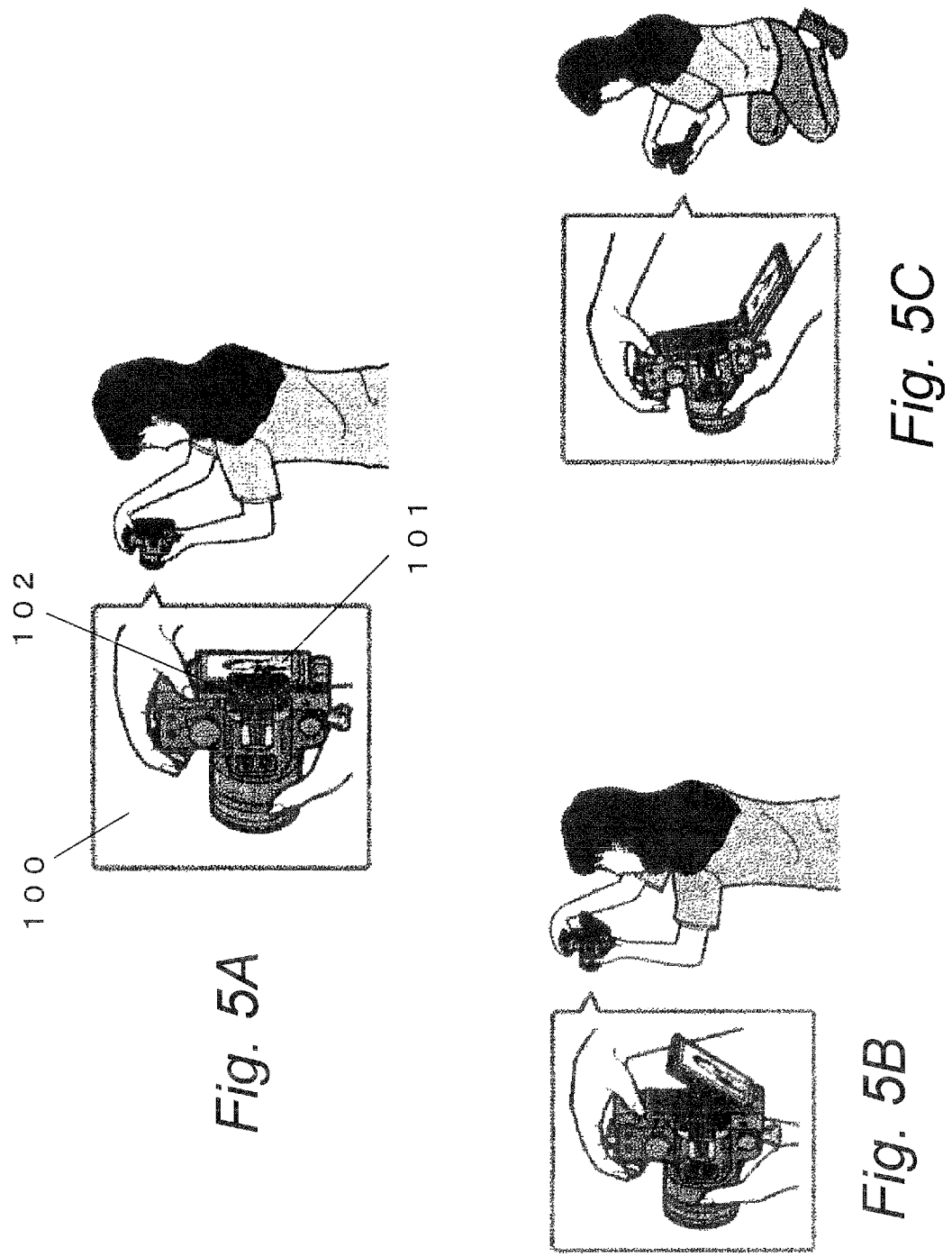
FIGS. 5A to 5C are diagrams describing general postures (vertical position) of the imaging apparatus during shooting of an image.

FIGS. 5A to 5C are diagrams showing other postures of the imaging apparatus 10. The difference in posture from FIGS. 4A to 4C is that the photographer holds the imaging apparatus 10 in a vertical position. FIGS. 5A, 5B, and 5C correspond to FIGS. 4A, 4B, and 4C, respectively.

Figure 6:
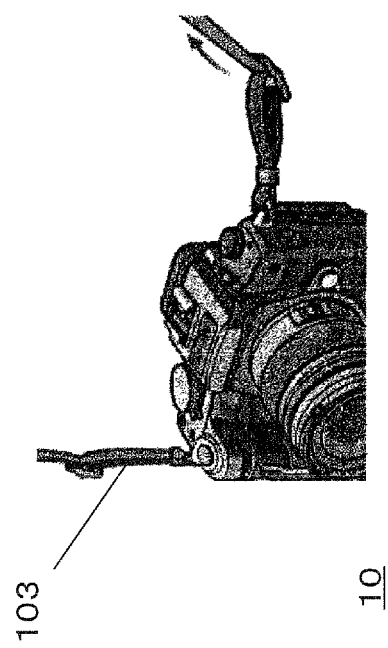
FIG. 6 is a diagram showing a state in which a strap is attached to the imaging apparatus.

FIG. 6 is a diagram showing a state in which a strap 103 is attached to the imaging apparatus 10. Although the strap 103 is not shown in FIGS. 5A to 5C, in shooting in a vertical position, since the strap 103 hangs down from a strap fixing portion of the imaging apparatus 10 on the right side as seen from the photographer, it can be easily understood that the problem of erroneous sensing by the eye proximity sensor 104 due to the strap 103 lying near the eye proximity sensor 104 becomes more serious.

3. Operation of Imaging Apparatus

3.1 Opening and Closing and Rotation of Movable LCD Monitor

The movable LCD monitor 101 can rotate with respect to the imaging apparatus 10 around two different axes (an axis in an X-direction and an axis in a Y direction), which will be specifically described with reference to FIGS. 7A and 7B. As shown in FIG. 7A, the movable LCD monitor 101 is rotatable using the axis in the Y direction as a rotation axis. Furthermore, as shown in FIG. 7B, the movable LCD monitor 101 is also rotatable using the axis in the X direction as a rotation axis. Both FIG. 7A and FIG. 7B show a non-set-in state in which the switch 105 is turned off.

Although, in the present embodiment, in the imaging apparatus 10 the movable LCD monitor 101 can rotate around two different axes, the configuration is not limited thereto. There are a variety of methods for mechanically implementing a movable LCD monitor (it is also called a "variable-angle LCD monitor", or the like). The display unit is not limited to a device using a LCD panel. For example, the display unit may be an organic EL display. In short, any display unit can be used as long as it is a movable display unit that can transition between a set-in state and a non-set-in state.

Figure 8A:
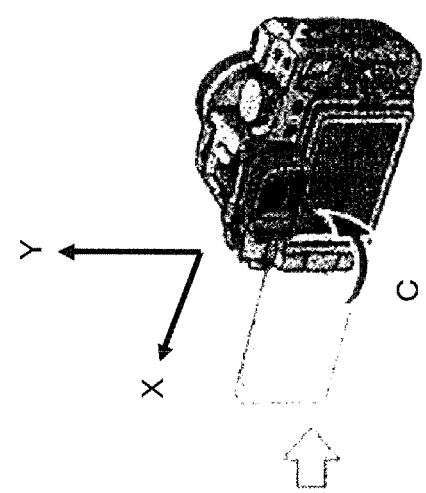
FIGS. 8A to 8C are diagrams describing opening and closing of the movable liquid crystal device monitor.
Figure 8B:
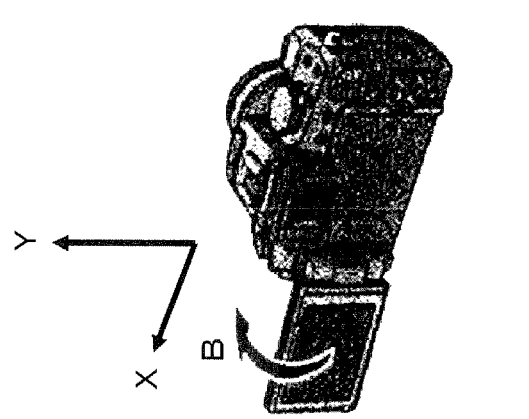
Figure 8C:
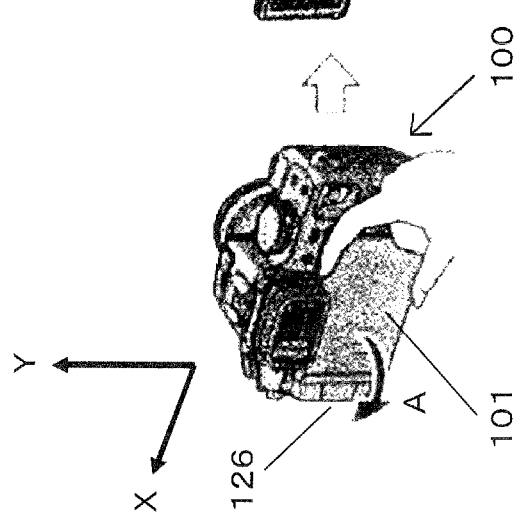

FIGS. 8A to 8C are diagrams describing how the movable LCD monitor 101 is opened and closed. FIG. 8A shows a state in which the movable LCD monitor 101 is set in the imaging apparatus 10 with the LCD panel of the movable LCD monitor 101 facing the imaging apparatus 10. When the imaging apparatus 10 is not used, setting, as described above, the movable LCD monitor 101 in the imaging apparatus 10 can prevent damage or cracking of the LCD panel. By rotating the movable LCD monitor 101 about the axis of Y direction in a direction indicated by arrow A in FIG. 8A, the movable LCD monitor 101 can be opened.

FIG. 8B shows a state in which the movable LCD monitor 101 is opened in the above-described manner. The LCD panel of the movable LCD monitor 101 faces the photographer's side. This state of the movable LCD monitor 101 is a "non-set-in state". When the movable LCD monitor 101 is opened to a certain extent, the movable LCD monitor 101 can also rotate about the axis of X direction. By rotating the movable LCD monitor 101 by 180° about the axis of X direction in a direction indicated by arrow B in FIG. 8B, the LCD panel of the movable LCD monitor 101 can face the subject side.

FIG. 8C shows a state in which the movable LCD monitor 101 is set in the imaging apparatus 10 with the LCD panel of the movable LCD monitor 101 facing the photographer side. By rotating the movable LCD monitor 101 by 180° about the axis of X direction in the direction indicated by arrow B from the state shown in FIG. 8B, and further rotating, from this state, the movable LCD monitor 101 about the axis of Y direction in a direction indicated by arrow C in FIG. 8C, the movable LCD monitor 101 results in a state shown in FIG. 8C. This state of the movable LCD monitor 101 is a "set-in state". In this state, the photographer can perform shooting while viewing a subject on the movable LCD monitor 101.

3-2. Detection of Open and Close of Movable LCD Monitor

As described above, the electronic viewfinder 102 is a display unit that allows the photographer to view a subject by placing photographer's eye in proximity to the electronic viewfinder 102. When the electronic viewfinder 102 is used, the photographer can support the imaging apparatus 10 by photographer's hands and a part of photographer's face so that the photographer can determine a composition stably. On the other hand, the movable LCD monitor 101 is a display unit that allows the photographer to view a subject without placing photographer's eye in proximity thereto. When the movable LCD monitor 101 is used, the photographer can view a subject on a relatively large screen, and can easily view a subject even in a situation in which it is difficult for the photographer to place photographer's eye in proximity to the electronic viewfinder 102, such as in high or low angle shooting. The movable LCD monitor 101 is configured such that the angle of the movable LCD monitor 101 with respect to the imaging apparatus 10 can be arbitrarily changed.

The body controller 111 performs control so as to display a subject image captured by the imaging device 109 on the electronic viewfinder 102 when the eye proximity sensor 104 senses eye proximity, and to display the subject image on the movable LCD monitor 101 when the eye proximity sensor 104 does not sense eye proximity. In addition, the body controller 111 can determine whether the movable LCD monitor 101 is in a set-in state or a non-set-in state, based on a sensing signal received from the switch 105. That is, the body controller 111 switches display of a subject image between a display on the movable LCD monitor 101 and a display on the electronic viewfinder 102, according to a sensing signal from the eye proximity sensor 104 and a sensing signal from the switch 105.

3-3. Operation of Imaging Apparatus

Figure 9:
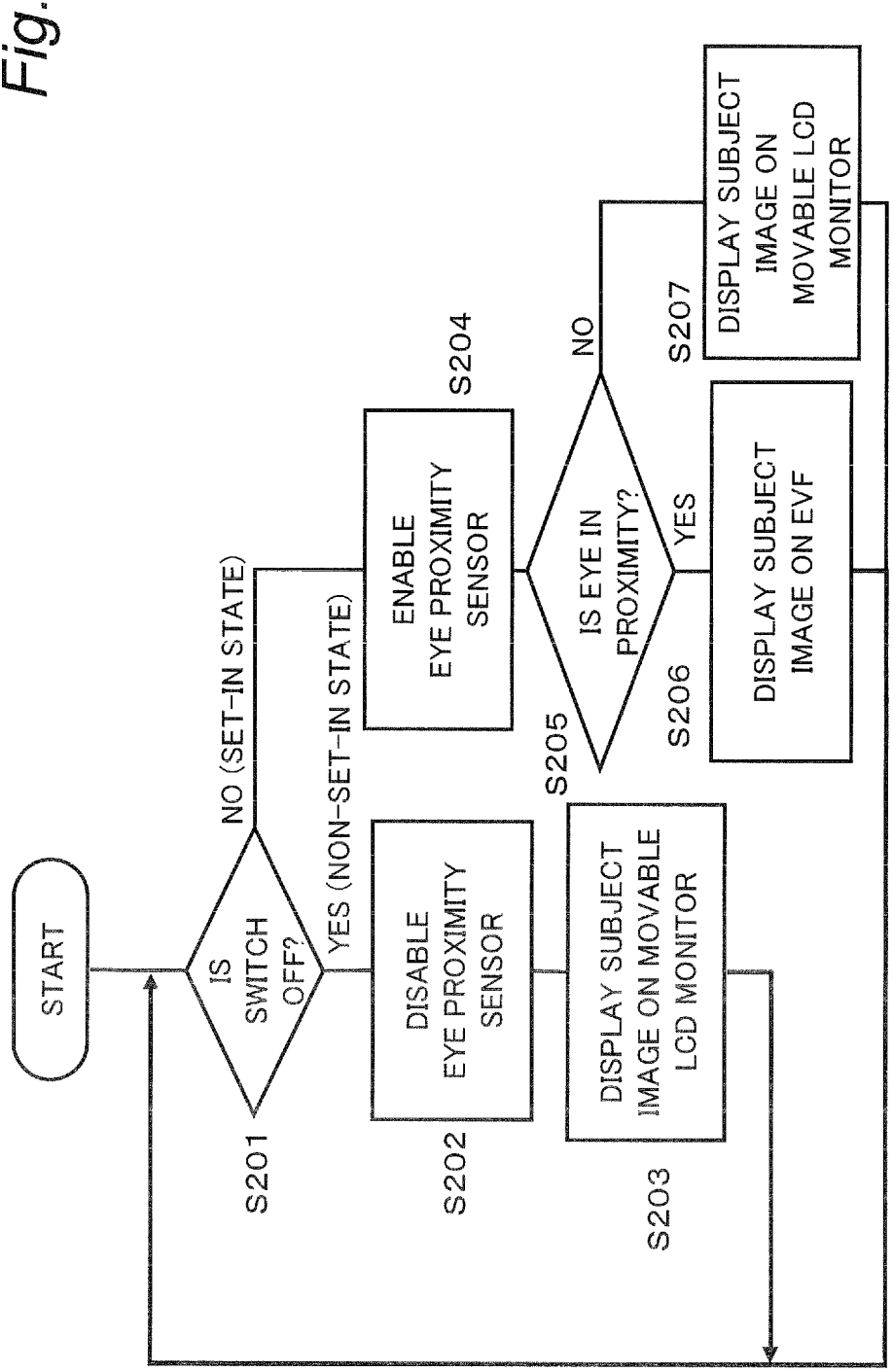
FIG. 9 is a flowchart showing a first example of switching operation of a display unit of the imaging apparatus.

FIG. 9 is a flowchart showing a first exemplary operation of the imaging apparatus 10. The body controller 111 included in the imaging apparatus 10 receives a sensing signal from the switch 105 and checks a state of the switch 105 (S201).

If the switch 105 is on (NO at S201), then the movable LCD monitor 101 is in a set-in state. Therefore, it is considered that the photographer is less likely to be performing shooting at a high or low angle. Hence, the eye proximity sensor 104 is turned on (operating state) (S204) so that whether to display a subject image on the movable LCD monitor 101 or the electronic viewfinder 102 can be automatically switched. Specifically, it is determined whether the eye proximity sensor 104 has sensed eye proximity, based on a sensing signal from the eye proximity sensor 104 (S205). If the eye proximity sensor 104 has sensed eye proximity (YES at S205), then a subject image is displayed on the electronic viewfinder 102 (S206). On the other hand, if the eye proximity sensor 104 has not sensed eye proximity (NO at S205), then a subject image is displayed on the movable LCD monitor 101 (S207).

On the other hand, if the switch 105 is turned off (YES at S201), then the movable LCD monitor 101 is in a non-set-in state. Therefore, it is considered that the photographer is highly likely to be performing shooting at a high or low angle. Hence, the eye proximity sensor 104 is turned off (S202) and a subject image is displayed on the movable LCD monitor 101 (S203).

4. Other Embodiments (1) In the flow shown in FIG. 9, when the movable LCD monitor 101 is in an set-in state, the eye proximity sensor 104 is turned on (S204), while the eye proximity sensor 104 is turned off when the movable LCD monitor 101 is in a non-set-in state (S202). By turning off the eye proximity sensor 104 when the movable LCD monitor 101 is in a non-set-in state, effect of reducing power consumption is provided. However, the control of switching the display unit is not limited to such control.

For example, switching between on and off of the eye proximity sensor 104 may not be performed according to whether the movable LCD monitor 101 is in a set-in state or a non-set-in state. In such a case, when the movable LCD monitor 101 is in a non-set-in state, the body controller 111 may ignore a sensing signal from the eye proximity sensor 104. That is, when the movable LCD monitor 101 is in a non-set-in state, even if eye proximity is sensed based on a sensing signal from the eye proximity sensor 104, the body controller 111 may not display a subject image on the electronic viewfinder 102 and may maintain display of the subject image on the movable LCD monitor 101.

(2) Further, the characteristics of the eye proximity sensor 104 may be changed according to whether the movable LCD monitor 101 is in a set-in state or a non-set-in state.

For example, when the movable LCD monitor 101 is in a set-in state, a sensing distance of the eye proximity sensor 104 may be longer, and when the movable LCD monitor 101 is in a non-set-in state, the sensing distance of the eye proximity sensor 104 may be shorter. The eye proximity sensor 104 senses eye proximity to output a sensing signal when an object is present within the sensing distance from the eye proximity sensor 104. That is, the sensing distance indicates the maximum distance of the distance from the eye proximity sensor 104 to the object, within which the eye proximity sensor 104 can sense the eye proximity. When the sensing distance is long, the eye proximity can be sensed even if the distance between the eye proximity sensor 104 and the object is relatively far. When the sensing distance is short, the eye proximity cannot be sensed unless the distance between the eye proximity sensor 104 and the object is relatively close. Note that to avoid erroneous sensing it is preferred that the sensing distance be short.

Figure 10:
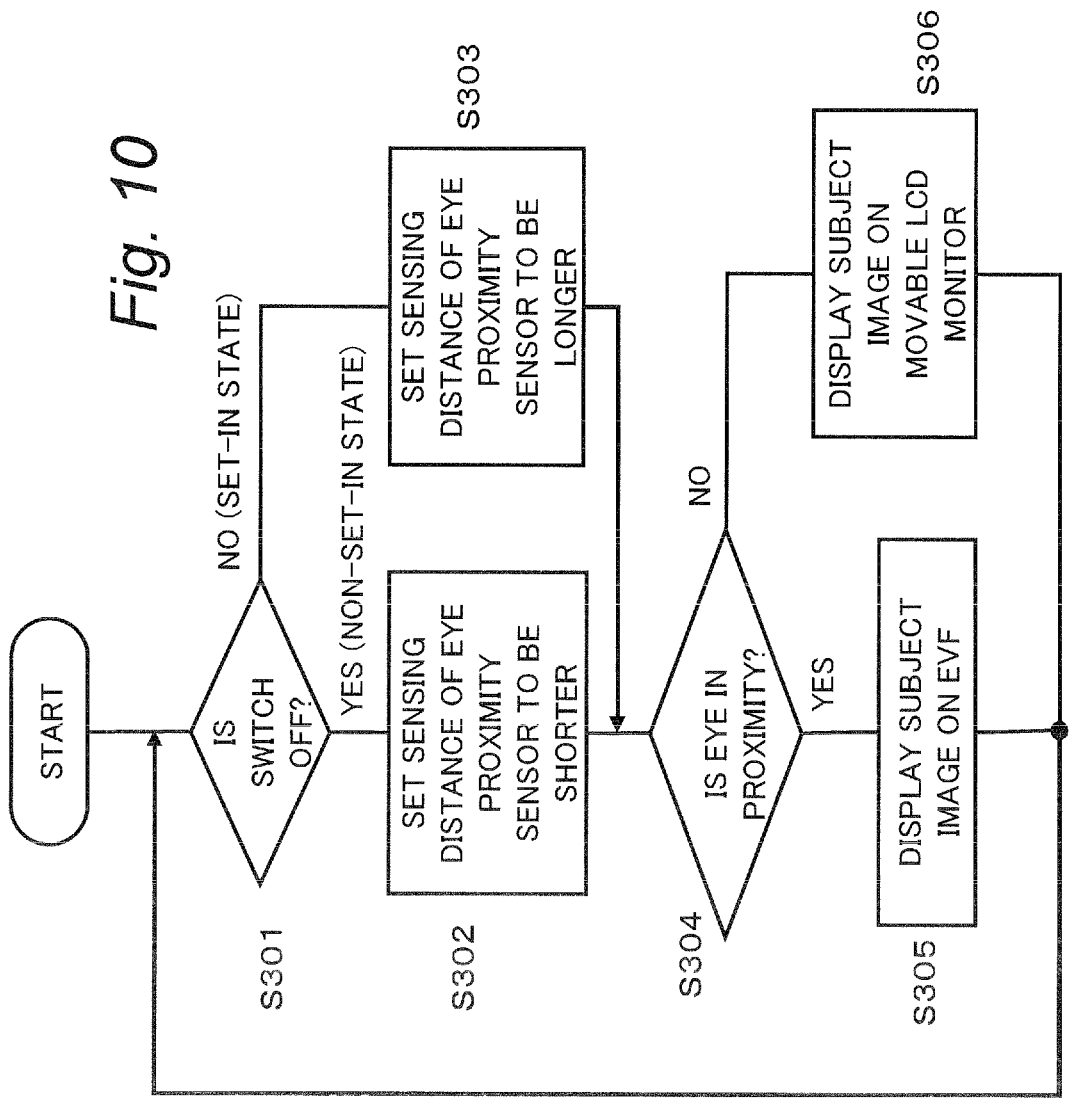
FIG. 10 is a flowchart showing a second example of the display unit switching operation of the imaging apparatus.

FIG. 10 shows a flowchart showing a second exemplary operation of the imaging apparatus 10. In this flow, the sensing distance of the eye proximity sensor 104 is switched based on set-in state/non-set-in state of the movable LCD monitor 101.

In FIG. 10, the body controller 111 of the imaging apparatus 10 receives a sensing signal from the switch 105 and checks a state of the switch 105 (S301).

If the switch 105 is on (NO at S301), then the movable LCD monitor 101 is in a set-in state. Therefore, it is considered that the photographer is less likely to be performing shooting at a high or low angle. Hence, the sensing distance of the eye proximity sensor 104 is set longer (S303). On the other hand, if the switch 105 is off (YES at S301), then the movable LCD monitor 101 is in a non-set-in state. Therefore, it is considered that the photographer is highly likely to be performing shooting at a high or low angle. Hence, the sensing distance of the eye proximity sensor 104 is set shorter (S302). The eye proximity sensor 104 is composed of, for example, a light-emitting device and a light-receiving device. Hence, by changing the amount of light emission of the light-emitting device or changing the sensitivity of the light-receiving device, the sensing distance can be changed. Furthermore, the sensing distance can also be changed by changing a threshold value (reference value for determining eye proximity) used for determining an output (current or voltage) from the eye proximity sensor 104.

Thereafter, it is determined whether eye proximity has been sensed, based on a sensing signal from the eye proximity sensor 104, regardless of the on or off state of the switch 105 (S304). If the eye proximity sensor 104 has sensed eye proximity (YES at S304), then a subject image is displayed on the electronic viewfinder 102 (S305). On the other hand, if the eye proximity sensor 104 has not sensed eye proximity (NO at S304), then a subject image is displayed on the movable LCD monitor 101 (S306).

By doing so, when the movable LCD monitor 101 is in a non-set-in state, i.e., when the photographer is highly likely to be performing shooting at a high or low angle, the sensing distance of the eye proximity sensor 104 can be set shorter, enabling to suppress erroneous sensing by the eye proximity sensor 104 which is caused by the proximity of a strap, etc., to the eye proximity sensor 104.

Figure 11:
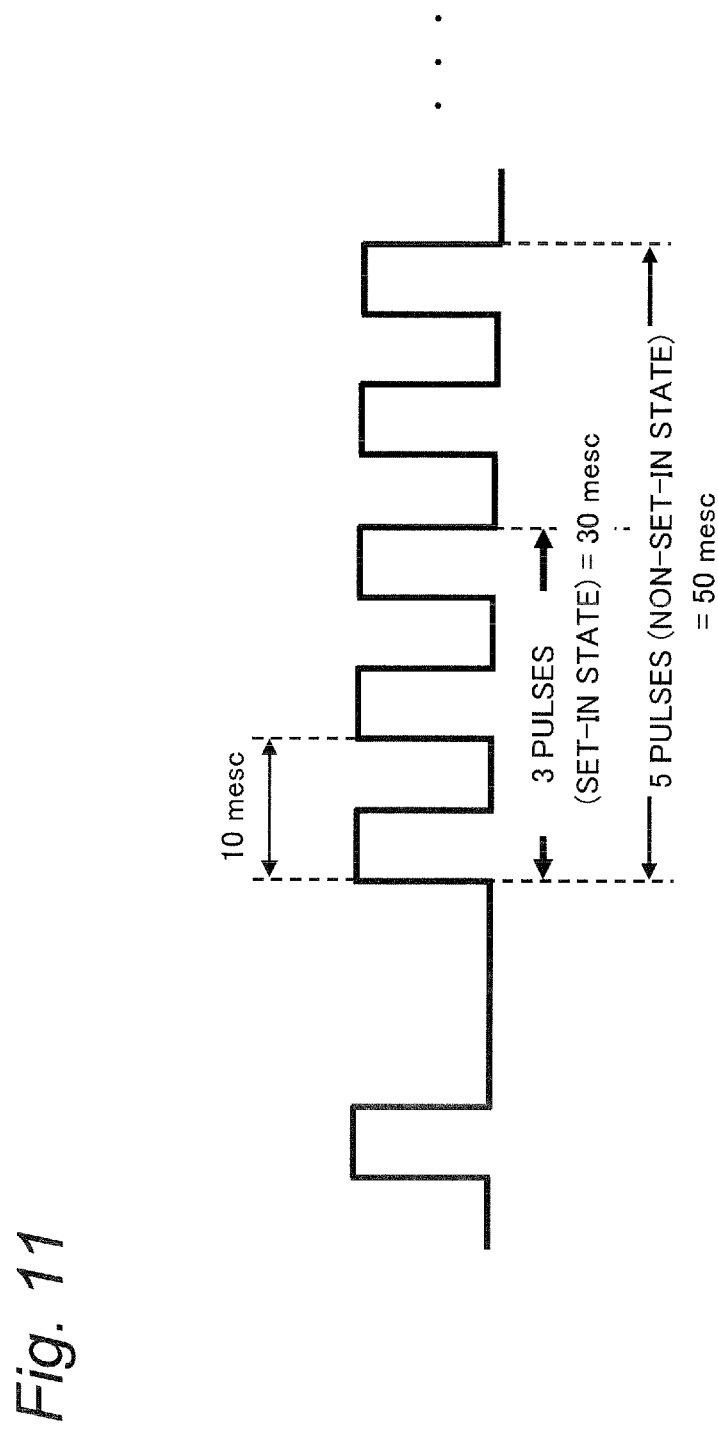
FIG. 11 is a diagram for describing a sensing time switching method for an eye proximity sensor.

(3) Instead of changing the sensing distance of the eye proximity sensor 104, sensing time of the eye proximity sensor 104 may be changed. The eye proximity sensor 104 outputs a sensing signal indicating that eye proximity is sensed, when continuously sensing eye proximity for a predetermined period of time. Hence, different values of the predetermined period of time may be set for the movable LCD monitor 101 being in a non-set-in state and the movable LCD monitor 101 being in a set-in state. Specifically, the predetermined period of time for the movable LCD monitor 101 being in a non-set-in state is set to be longer than the predetermined period of time for the movable LCD monitor 101 being in a set-in state. For example, the predetermined period of time for the movable LCD monitor 101 being in a set-in state may be set to 30 msec, and the predetermined period of time for the movable LCD monitor 101 being in a non-set-in state may be set to 50 msec. For example, as shown in FIG. 11, inside the eye proximity sensor 104, it is sensed whether an object is in proximity within a predetermined distance every certain period of time (10 msec in the example in FIG. 11). If it is sensed that the object is in proximity within the predetermined distance, then one pulse signal is generated. In this case, when the movable LCD monitor 101 is in a non-set-in state, if five pulses are continuously generated, i.e., if it is sensed for 50 msec that the object is in proximity within the predetermined distance, then the eye proximity sensor 104 may output a sensing signal indicating eye proximity. On the other hand, when the movable LCD monitor 101 is in a set-in state, if three pulses are continuously generated, i.e., if it is sensed for 30 msec that the object is in proximity within the predetermined distance, then the eye proximity sensor 104 may output a sensing signal indicating eye proximity.

That is, when the movable LCD monitor 101 is in a non-set-in state, i.e., when the photographer is highly likely to be performing shooting at a high or low angle, a sensing signal indicating that eye proximity is sensed is outputted when eye proximity is sensed for a longer period of time. By doing so, even if the photographer's finger, a strap, or the like, momentarily approaches the eye proximity sensor 104 while the photographer is operating the movable LCD monitor 101, the eye proximity sensor 104 can be prevented from erroneously sensing, as eye proximity, the proximity of the finger, the strap, or the like, to the eye proximity sensor 104 since the sensing time is set to a relatively long time. Accordingly, inconvenience can be avoided that the display unit for a subject image is involuntarily switched from the movable LCD monitor 101 to the electronic viewfinder 102. Note that it is desirable to set the time (the predetermined period of time) for determining eye proximity to a time that the photographer does not feel inconvenience, so that the photographer does not feel, too long, a time for switching display of a subject from the movable LCD monitor 101 to the electronic viewfinder 102, when the photographer actually places his/her eye in proximity to the electronic viewfinder 102.

Note that both the sensing time and the sensing distance may be changed according to whether the movable LCD monitor 101 is in a set-in state or a non-set-in state.

(4) Although in the above-described embodiment the switch 105 as shown in FIG. 2 is provided as a state detector for the movable LCD monitor 101, the configuration of the state detector for the movable LCD monitor 101 is not limited thereto. For example, a projection may be provided on a Y-direction shaft section 126 of the movable LCD monitor 101, and a switch may be provided at a position of the imaging apparatus 10 at which the imaging apparatus 10 can contact the projection. Alternatively, a Hall sensor and a magnet may be provided in the Y-direction shaft section 126, and it may be determined whether the movable LCD monitor 101 is in a set-in state or a non-set-in state, according to the change in distance between the Hall sensor and the magnet when the movable LCD monitor 101 rotates around the Y-axis. By using the Hall sensor, the distance between the Hall sensor and the magnet for determining that the movable LCD monitor 101 is in a non-set-in state can be changed. Therefore, it can be configured such that the movable LCD monitor 101 is not determined to be in a non-set-in state unless the movable LCD monitor 101 is opened to a certain extent. In short, any method can be used as long as the body controller 111 can determine whether the movable LCD monitor 101 is in a set-in state or a non-set-in state.

The above describes the case in which a subject image is displayed on the movable LCD monitor 101 for the purpose of shooting a picture by the photographer. However, the idea of the present embodiment can also be applied to a case in which the user displays and plays back recorded images on the movable LCD monitor 101. Alternatively, the idea may be limited to the case in which a subject image is displayed on the movable LCD monitor 101 for the purpose of shooting a picture by the photographer.

5. Summary

As described above, the imaging apparatus 10 according to the above-described embodiment includes the electronic viewfinder 102, the movable LCD monitor 101 that can take either one of a set-in state in which the movable LCD monitor 101 is set in the body of the imaging apparatus 10 and a non-set-in state in which the movable LCD monitor 101 flips out from the body of the imaging apparatus 10, the eye proximity sensor 104 that senses proximity of an object, and the body controller 111 that allows the electronic viewfinder 102 to display an image when the eye proximity sensor 104 senses proximity of the object, and allows the movable LCD monitor 101 to display an image when the eye proximity sensor 104 does not senses proximity of the object. The body controller 111 controls image display on the electronic viewfinder 102 and/or the movable LCD monitor 101, according to the state (set-in state/non-set-in state) of the movable LCD monitor 101.

For example, the body controller 111 stops a sensing function of the eye proximity sensor 104 when the movable LCD monitor 101 is in the non-set-in state.

Alternatively, when the movable LCD monitor 101 is in the non-set-in state, even if the eye proximity sensor 104 senses the proximity of the object, the body controller 111 may not allow the electronic viewfinder 102 to display an image.

Alternatively, when the object is present within a predetermined sensing distance from the eye proximity sensor 104, the eye proximity sensor 104 senses the proximity of the object. The body controller 111 may set a sensing distance for the movable LCD monitor 101 being in the non-set-in state to be shorter than a sensing distance for the movable LCD monitor 101 being in the set-in state.

Alternatively, when the object is continuously sensed for a predetermined sensing time or more, the eye proximity sensor 104 senses the proximity of the object. The body controller 111 may set a sensing time for the movable LCD monitor 101 being in the non-set-in state to be longer than a sensing time for the movable LCD monitor 101 being in the set-in state.

According to the above configuration, when the movable LCD monitor 101 is in the non-set-in state, even if the eye proximity sensor 104 senses the proximity of the object, the body controller 111 can allow the electronic viewfinder 102 not to display an image. With this, an imaging apparatus can be provided, which can prevent erroneous sensing by the eye proximity sensor 104 even when the photographer performs shooting at a high or low angle, thus significantly improving usability.

6. Term Correspondence

The electronic viewfinder 102 is an example of a first display unit. The movable LCD monitor 101 is an example of a second display unit. The eye proximity sensor 104 is an example of a proximity sensor. The body controller 111 is an example of a controller.

INDUSTRIAL APPLICABILITY

The embodiment can prevent erroneous sensing of eye proximity by a proximity sensor even when shooting is performed at a high or low angle, and thus it is useful in imaging apparatuses such as digital still cameras and digital video cameras.

What is claimed is:

1. An imaging apparatus for capturing an image comprising:
    a first display unit;
    a second display unit capable of being in a set-in state in which the second display unit is set in a body of the imaging apparatus or a non-set-in state in which the second display unit is not set in the body of the imaging apparatus;
    a proximity sensor operable to sense a proximity of an object; and
    a controller operable to allow the first display unit to display an image when the proximity sensor senses the proximity of the object, and allow the second display unit to display an image when the proximity sensor does not sense the proximity of the object,
    wherein the controller enables a sensing function of the proximity sensor when the second display unit is in the set-in state and disables the sensing function of the proximity sensor when the second display unit is in the non-set-in state.

2. The imaging apparatus according to claim 1, wherein the first display unit is an electronic viewfinder and the second display unit is a movable LCD monitor.

3. An imaging apparatus for capturing an image comprising:
    a first display unit;
    a second display unit capable of being in a set-in state in which the second display unit is set in a body of the imaging apparatus or a non-set-in state in which the second display unit is not set in the body of the imaging apparatus;
    a proximity sensor operable to sense a proximity of an object; and
    a controller operable to allow the first display unit to display an image when the proximity sensor senses the proximity of the object, and allow the second display unit to display an image when the proximity sensor does not sense the proximity of the object,
    wherein the controller controls a sensing function of the proximity sensor according to whether the second display unit is in the set-in state or the non-set-in state,
    wherein, the proximity sensor senses the proximity of the object when the object is continuously sensed for at least a predetermined sensing time, and
    the controller sets the predetermined sensing time for the second display unit being in the non-set-in state to be longer than the predetermined sensing time for the second display unit being in the set-in state.

4. The imaging apparatus according to claim 3, wherein the first display unit is an electronic viewfinder and the second display unit is a movable LCD monitor.

5. An imaging apparatus for capturing an image comprising:
    a first display unit;
    a second display unit capable of being in a set-in state in which the second display unit is set in a body of the imaging apparatus or a non-set-in state in which the second display unit is not set in the body of the imaging apparatus;
    a proximity sensor operable to sense a proximity of an object; and
    a controller operable to allow the first display unit to display an image when the proximity sensor senses the proximity of the object, and allow the second display unit to display an image when the proximity sensor does not sense the proximity of the object, wherein the controller controls a sensing function of the proximity sensor according to whether the second display unit is in the set-in state or the non-set-in state, wherein, the proximity sensor senses the proximity of the object when the object is present within a predetermined sensing distance from the proximity sensor, and the controller sets the predetermined sensing distance for the second display unit being in the non-set-in state to be shorter than the predetermined sensing distance for the second display unit being in the set-in state.

6. The imaging apparatus according to claim 5, wherein the first display unit is an electronic viewfinder and the second display unit is a movable LCD monitor.

7. An imaging apparatus for capturing an image comprising:

a first display unit;

a second display unit capable of being in a set-in state in which the second display unit is set in a body of the imaging apparatus or a non-set-in state in which the second display unit is not set in the body of the imaging apparatus;

a proximity sensor operable to sense a proximity of an object; and a controller operable to allow the first display unit to display an image when the proximity sensor senses the proximity of the object, and allow the second display unit to display an image when the proximity sensor does not sense the proximity of the object, wherein the controller controls a sensing function of the proximity sensor according to whether the second display unit is in the set-in state or the non-set-in state, wherein the proximity sensor senses the proximity of the object when at least one of a following occurs: it is sensed that the object is within a predetermined sensing distance from the proximity sensor; and the object is continuously sensed for at least a predetermined sensing time, and the controller sets the predetermined sensing distance for the second display unit being in the non-set-in state to be shorter than the predetermined sensing distance for the second display unit being in the set-in state.

8. The imaging apparatus according to claim 7, wherein the first display unit is an electronic viewfinder and the second display unit is a movable LCD monitor.

9. An imaging apparatus for capturing an image comprising:

a first display unit;

a second display unit capable of being in a set-in state in which the second display unit is set in a body of the imaging apparatus or a non-set-in state in which the second display unit is not set in the body of the imaging apparatus;

a proximity sensor operable to sense a proximity of an object; and a controller operable to allow the first display unit to display an image when the proximity sensor senses the proximity of the object, and allow the second display unit to display an image when the proximity sensor does not sense the proximity of the object, wherein the controller controls a sensing function of the proximity sensor according to whether the second display unit is in the set-in state or the non-set-in state, wherein the proximity sensor senses the proximity of the object, when it is sensed that the object is within a predetermined sensing distance from the proximity sensor and/or when the object is continuously sensed for a predetermined sensing time or more, and the controller sets the predetermined sensing time for the second display unit being in the non-set-in state to be longer than the predetermined sensing time for the second display unit being in the set-in state.

10. The imaging apparatus according to claim 9, wherein the first display unit is an electronic viewfinder and the second display unit is a movable LCD monitor.

* * * * *